(12) United States Patent
Yamazaki et al.

(10) Patent No.: US 11,226,792 B2
(45) Date of Patent: Jan. 18, 2022

(54) TRIGONOMETRIC FUNCTION CALCULATING DEVICE

(71) Applicants: LAPIS Semiconductor Co., Ltd., Yokohama (JP); TAMAGAWA SEIKI Co., Ltd., Nagano Prefecture (JP)

(72) Inventors: Masato Yamazaki, Yokohama (JP); Hirofumi Maruyama, Nagano Prefecture (JP)

(73) Assignees: LAPIS SEMICONDUCTOR CO., LTD., Yokohama (JP); TAMAGAWA SEIKI CO., LTD., Nagano Prefecture (JP)

( * ) Notice: Subject to any disclaimer, the term of this patent is extended or adjusted under 35 U.S.C. 154(b) by 11 days.

(21) Appl. No.: 16/915,994

(22) Filed: Jun. 29, 2020

(65) Prior Publication Data

US 2021/0004207 A1 Jan. 7, 2021

(51) Int. Cl.
*G06F 7/548* (2006.01)
*G06F 1/03* (2006.01)

(52) U.S. Cl.
CPC ............ *G06F 7/548* (2013.01); *G06F 1/0321* (2013.01); *G06F 2101/04* (2013.01)

(58) Field of Classification Search
CPC ................................ G06F 7/548; G06F 1/0321
USPC ......................................................... 708/440
See application file for complete search history.

(56) References Cited

U.S. PATENT DOCUMENTS

| | | | | | |
|---|---|---|---|---|---|
| 4,486,846 A | * | 12/1984 | McCallister | .......... | G06F 1/0356 327/106 |
| 4,809,205 A | * | 2/1989 | Freeman | ................ | G06F 1/0356 708/276 |
| 5,276,633 A | * | 1/1994 | Fox | ........................ | G06F 1/0353 708/276 |
| 6,640,237 B1 | * | 10/2003 | Genrich | ................ | G06F 1/0356 708/276 |
| 8,200,728 B2 | * | 6/2012 | Michaels | ................... | G06F 1/03 708/276 |
| 8,659,331 B2 | * | 2/2014 | Hoyle | ................... | G06F 1/0356 327/129 |

(Continued)

OTHER PUBLICATIONS

Seiichi Horie, "Learning of DSP through Audio Signal Processing (No. 7), Sine Wave Generation: Techniques of Referring to Tables", Interface, CQ Publications, Oct. 2007, pp. 166-174.

*Primary Examiner* — Tan V Mai
(74) *Attorney, Agent, or Firm* — Rabin & Berdo, P.C.

(57) ABSTRACT

A trigonometric function calculating device includes: an address generator that generates an address signal that is formed from plural bit strings and corresponds to a phase; a trigonometric function table that stores first sines and first cosines that respectively correspond to phases expressed by upper bits of the address signals, and second sines and a second cosines that respectively correspond to phases expressed by lower bits of the address signals; a calculation circuit that outputs, as a calculated value, a sine that corresponds to the address signal by calculating processing using the first sine, the first cosine, the second sine and the second cosine that correspond to the address signal and have been extracted by referring to the trigonometric function table; and a correcting section that corrects the calculated value on the basis of a correction value corresponding to the address signal.

9 Claims, 6 Drawing Sheets

(56) References Cited

U.S. PATENT DOCUMENTS

2003/0229658 A1\* 12/2003 Guidry ................. G06F 1/0356
708/272

\* cited by examiner

FIG.2

| PHASE ANGLE | FIRST SINE | FIRST COSINE |
|---|---|---|
| $\alpha$ (°) | $\sin\alpha$ | $\cos\alpha$ |
| 0 | 0.00000000 | 1.00000000 |
| 10 | 0.17364818 | 0.98480775 |
| 20 | 0.34202014 | 0.93969262 |
| 30 | 0.50000000 | 0.86602540 |
| 40 | 0.64278761 | 0.76604444 |
| 50 | 0.76604444 | 0.64278761 |
| 60 | 0.86602540 | 0.50000000 |
| 70 | 0.93969262 | 0.34202014 |
| 80 | 0.98480775 | 0.17364818 |
| 90 | 1.00000000 | 0.00000000 |

FIG.3

| PHASE ANGLE | SECOND SINE | SECOND COSINE |
| --- | --- | --- |
| $\beta$ (°) | $\sin\beta$ | $\cos\beta$ |
| 0 | 0.00000000 | 1.00000000 |
| 1 | 0.01745241 | 0.99984770 |
| 2 | 0.03489950 | 0.99939083 |
| 3 | 0.05233596 | 0.99862953 |
| 4 | 0.06975647 | 0.99756405 |
| 5 | 0.08715574 | 0.99619470 |
| 6 | 0.10452846 | 0.99452190 |
| 7 | 0.12186934 | 0.99254615 |
| 8 | 0.13917310 | 0.99026807 |
| 9 | 0.15643447 | 0.98768834 |

FIG.4

| PHASE ANGLE | CORRECTION VALUE |
| --- | --- |
| $\alpha+\beta$ (°) | $\varepsilon$ |
| 0 | 0.00000000 |
| 1 | 0.00000000 |
| 2 | 0.00000000 |
| 3 | 0.00000000 |
| ⋮ | ⋮ |
| 9 | 0.00000000 |
| 10 | 0.00000000 |
| 11 | 0.00000000 |
| 12 | -0.00000001 |
| 13 | -0.00000001 |
| 14 | 0.00000001 |
| 15 | 0.00000001 |
| ⋮ | ⋮ |
| 89 | 0.00000001 |
| 90 | 0.00000000 |

41

TRIGONOMETRIC FUNCTION CALCULATING DEVICE

CROSS-REFERENCE TO RELATED APPLICATION

This application is based on and claims priority under 35 USC 119 from Japanese Patent Application No. 2019-123014 filed on Jul. 1, 2019, the disclosure of which is incorporated by reference herein.

BACKGROUND

Technical Field

The present disclosure relates to a trigonometric function calculating device.

Related Art

The following technique is known as a technique of generating a sine wave. For example, "Learning of DSP through Audio Signal Processing (No. 7), Sine Wave Generation: Techniques of Referring to Tables" by Seiichi Hone, Interface, CQ Publications, October 2007, pp. 166-174 (Non-Patent Document 1) discloses, in a case of generating a sine wave by calculating a trigonometric function by referring to a table, suppressing the amount of data of the table by using the addition theorem of trigonometric functions expressed by following formula (1). Concretely, it is disclosed that, in a case in which a circumference is expressed by 16 bits, a table in which the circumference is divided into 256 portions, and a table in which the circumference is divided into 65,536 portions, are prepared, and the 16-bit index that expresses the circumference is separated into upper and lower 8 bits each, and the respective tables are referred to by using the divisional indices, and the values are combined by using formula (1). Due thereto, a trigonometric function that divides a circumference at an accuracy of 16 bits can be created.

[Formula 1]

$$\sin(\alpha+\beta)=\sin\alpha\cos\beta+\cos\alpha\sin\beta \quad \text{Formula (1)}$$

SUMMARY

However, even in a case in which a sine wave is generated by using an addition theorem such as described above, in order to improve the accuracy of the sine wave, the data lengths of the data that are recorded in the table must be made to be long. For example, in a case of generating a sine wave to an accuracy of 8 decimal places and without errors, values of $\sin\alpha$, $\cos\alpha$, $\sin\beta$, $\cos\beta$ that are expressed at an accuracy of 10 decimal places must be recorded in advance in the tables. If the data length of the data that is recorded in the table becomes long in this way, the circuit sizes of the calculation circuits, such as the multiplication circuit and the addition circuit and the like that carry out calculating processings by using the values recorded in the tables, becomes large.

The present disclosure was made in view of the above-described circumstances, and an object thereof is to provide a trigonometric function calculating device that can ensure accuracy of trigonometric function calculation without being accompanied by an increase in the circuit sizes of the calculation circuits.

In order to achieve the above-described object, a trigonometric function calculating device of the present disclosure includes: an address generator that generates an address signal that is formed from plural bit strings and corresponds to a phase; a trigonometric function table that stores first sines and first cosines that respectively correspond to phases expressed by upper bits of the address signals, and second sines and second cosines that respectively correspond to phases expressed by lower bits of the address signals; a calculation circuit that outputs, as a calculated value, a sine that corresponds to the address signal by calculating processing using the first sine, the first cosine, the second sine and the second cosine that correspond to the address signal and have been extracted by referring to the trigonometric function table; and a correcting section that corrects the calculated value on the basis of a correction value corresponding to the address signal.

In accordance with the present disclosure, accuracy of trigonometric function calculation can be ensured without being accompanied by an increase in the circuit sizes of the calculation circuits.

BRIEF DESCRIPTION OF THE DRAWINGS

FIG. 2 is a drawing showing an example of a first trigonometric function table relating to the embodiment of the present disclosure.

FIG. 3 is a drawing showing an example of a second trigonometric function table relating to the embodiment of the present disclosure.

FIG. 4 is a block drawing showing an example of a correction value table relating to the embodiment of the present disclosure.

DETAILED DESCRIPTION

An example of an embodiment of the present disclosure is described in detail hereinafter with reference to the drawings.

Figure 1:
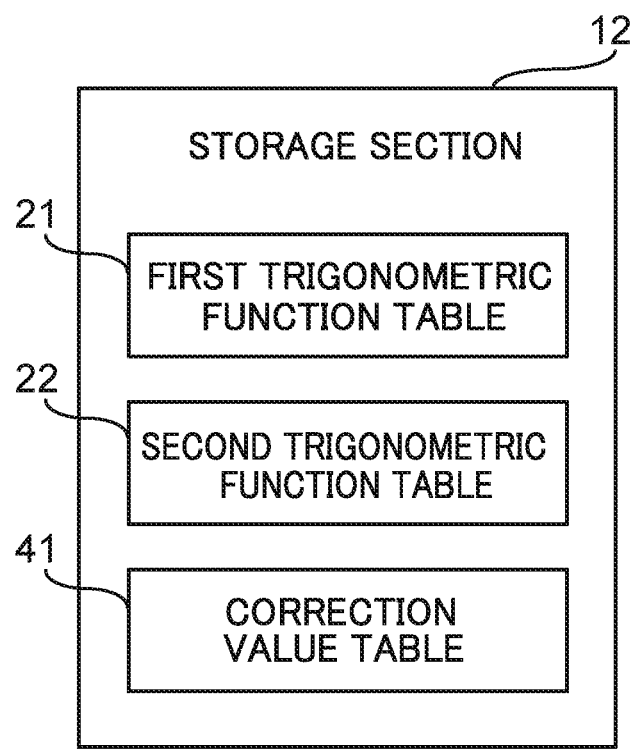
FIG. 1 is a drawing showing an example of a storage section relating to an embodiment of the present disclosure.

First, a storage section 12 relating to the present embodiment is described with reference to FIG. 1. The storage section 12 is realized by a ROM (Read Only Memory), a RAM (Random Access Memory), a register, and a volatile or non-volatile storage medium such as an HDD (Hard Disk Drive), an SSD (Solid State Drive), a flash memory or the like. A first trigonometric function table 21, a second trigonometric function table 22 and a correction value table 41 are stored in the storage section 12 that serves as a storage medium.

An example of the first trigonometric function table 21 is shown in FIG. 2. The first trigonometric function table 21 is a table in which are stored first sines and first cosines that correspond to the respective phases expressed by the upper bits of an address signal that is described later. As shown in FIG. 2, as an example, first sine $\sin\alpha$ and first cosine $\cos\alpha$, which correspond to phase $\alpha$ (0°≤α≤90°) that is expressed by the upper bits of the address signal, are stored in the first trigonometric function table 21 in increments of 10°. In the present embodiment, first sine $\sin\alpha$ and first cosine $\cos\alpha$ are stored as values of accuracies of 8 decimal places in the first trigonometric function table 21.

An example of the second trigonometric function table 22 is shown in FIG. 3. The second trigonometric function table 22 is a table in which are stored second sines and second cosines that correspond to the respective phases expressed by the lower bits of the address signal that is described later. As shown in FIG. 3, as an example, second sine sin β and second cosine cos β, which correspond to phase β ($0°≤β≤9°$) that is expressed by the lower bits of the address signal, are stored in the second trigonometric function table 22 in increments of 1°. In the present embodiment, second sine sin β and second cosine cos β are stored as values of accuracies of 8 decimal places in the second trigonometric function table 22.

An example of the correction value table 41 is shown in FIG. 4. The correction value table 41 is a table in which are stored correction values that correspond to the respective phases expressed by the address signal. As shown in FIG. 4, correction value ε, which corresponds to the phase α+β ($0°≤(α+β)≤90°$) expressed by the address signal, is stored in increments of 1° angles.

The correction value ε corresponds to the difference (i.e., the error) between the actual value of sin(α+β) and a calculated value that is calculated by a calculation circuit 30 of a trigonometric function calculating device 10 relating to the present embodiment that is described later and that uses the addition theorem of trigonometric functions that is expressed by formula (1) that uses sin α, sin β, cos α, cos β. Namely, given that difference (Q−P) between an actual value Q and a calculated value P, which is calculated by the calculation circuit 30 and which corresponds to the phase (α+β) expressed by the address signal, is ε1, that ε1 is stored in the correction value table 41 as the correction value ε that corresponds to the phase (α+β) expressed by that address signal. In a case in which sin α, sin β, cos α and cos β are respectively values t0 that are accurate to 8 decimal places, as shown in FIG. 4, the error is kept between −0.00000001 and 0.00000001.

Figure 5:
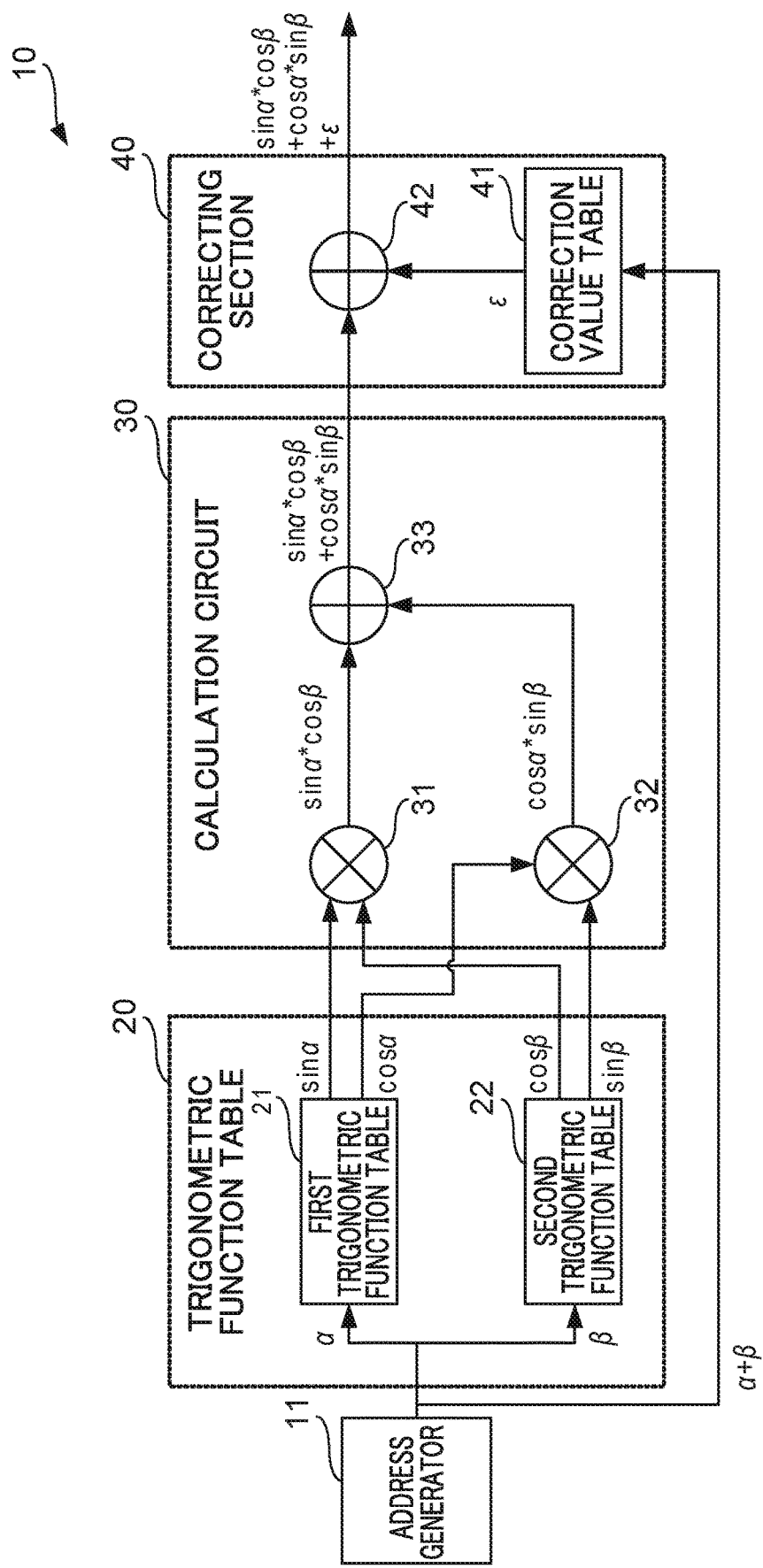
FIG. 5 is a block drawing showing an example of functional structures of a trigonometric function calculating device relating to the embodiment of the present disclosure.

Next, the structure of the trigonometric function calculating device 10 relating to the present embodiment is described with reference to FIG. 5. As shown in FIG. 5, the trigonometric function calculating device 10 includes an address generator 11, a trigonometric function table 20, the calculation circuit 30 and a correcting section 40.

The address generator 11 generates an address signal that is formed from plural bit strings corresponding to the phase (α+β). The trigonometric function table 20 is a table that stores first sine sin α and first cosine cos α that correspond to respective phases α that are expressed by the upper bits of address signals, and second sine sin β and second cosine cos β that correspond to respective phases β that are expressed by the lower bits of address signals. Namely, the trigonometric function table 20 includes the first trigonometric function table 21 and the second trigonometric function table 22.

The calculation circuit 30 outputs, as the calculated value, the sine that corresponds to an address signal, by calculation processing by using first sine sin α, first cosine cos α, second sine sin β and second cosine cos β that correspond to the address signal and that have been extracted by referring to the trigonometric function table 20. Concretely, the calculation circuit 30 includes a first multiplication circuit 31 that outputs product sin α*cos β of the first sine sin α and the second cosine cos β, second multiplication circuit 32 that outputs product sin β*cos α of the second sine sin β and the first cosine cos α, and addition circuit 33 that adds the outputted value of the first multiplication circuit 31 and the outputted value of the second multiplication circuit 32, and outputs sin α*cos β+sin β*cos α as the calculated value of the calculation circuit 30.

The correcting section 40 corrects the calculated value sin α*cos β+sin β*cos α that is outputted from the calculation circuit 30, on the basis of the correction value ε that corresponds to the address signal. Concretely, the correcting section 40 includes the correction value table 41 and an addition circuit 42. The addition circuit 42 adds the correction value ε, which corresponds to the address signal and is extracted by referring to the correction value table 41, and the calculated value sin α*cos β+sin β*cos α that is outputted from the calculation circuit 30.

Operation of the trigonometric function calculating device 10 relating to the present embodiment is described next.

First, the address generator 11 generates an address signal that is formed from plural bit strings and corresponds to the phase (α+β), and outputs the address signal to the trigonometric function table 20 and the correcting section 40. Then, the first trigonometric function table 21 extracts first sine sin α and first cosine cos α, which correspond to phase α that is expressed by the upper bits of the address signal, and outputs first sine sin α to the first multiplication circuit 31 and outputs first cosine cos α to the second multiplication circuit 32. Further, the second trigonometric function table 22 extracts second sine sin β and second cosine cos β, which correspond to phase β that is expressed by the lower bits of the address signal, and outputs second sine sin β to the second multiplication circuit 32 and second cosine cos β to the first multiplication circuit 31.

Next, the first multiplication circuit 31 calculates the product of first sine sin α and second cosine cos β, and outputs calculation results sin α*cos β to the addition circuit 33. Further, the second multiplication circuit 32 calculates the product of second sine sin β and first cosine cos α, and outputs calculation results sin β*cos α to the addition circuit 33. Then, the addition circuit 33 adds outputted value sin α*cos β of the first multiplication circuit 31 and outputted value cos α*sin β of the second multiplication circuit 32, and outputs calculation results sin α*cos β+sin β*cos α to the correcting section 40 as the calculated value of the calculation circuit 30.

After acquiring the address signal, the correcting section 40 refers to the correction value table 41, and extracts the correction value ε that corresponds to the phase (α+β) expressed by the address signal. Then, by the addition circuit 42, the correcting section 40 adds calculated value sin α*cos β+cos α*sin β of the calculation circuit 30 and the correction value ε, and outputs sin α*cos β+cos α*sin β+ε as the value corresponding to sine sin(α+β) that corresponds to the address signal.

As a concrete example, a case in which the address generator 11 generates an address signal corresponding to the phase of 12° is described. The first trigonometric function table 21 extracts first sine 0.17364818, first cosine 0.98480775 corresponding to the phase of 10° that is expressed by the upper bits of the address signal, and outputs first sine 0.17364818 to the first multiplication circuit 31, and outputs first cosine 0.98480775 to the second multiplication circuit 32. Further, the second trigonometric function table 22 extracts second sine 0.03489950, second cosine 0.99939083 corresponding to the phase of 2° that is expressed by the lower bits of the address signal, and outputs second sine 0.03489950 to the second multiplication circuit 32, and outputs second cosine 0.99939083 to the first multiplication circuit 31.

Next, the first multiplication circuit 31 calculates the product of first sine 0.17364818 and second cosine 0.99939083, and outputs the calculation results 0.173542398738189 to the addition circuit 33. The second multiplication circuit 32 calculates the product of first cosine 0.98480775 and second sine 0.03489950, and outputs the calculation results 0.034369298071125 to the addition circuit 33. The addition circuit 33 rounds off, at the ninth digit to the right of the decimal point, the sum 0.207911696809314 of the outputted value 0.173542398738189 of the first multiplication circuit 31 and the outputted value 0.034369298071125 of the second multiplication circuit 32, and outputs the value 0.20791170, which is 8 digits to the right of the decimal point, to the correcting section 40 as the calculated value of the calculation circuit 30.

After acquiring the address signal corresponding to the phase of 12°, the correcting section 40 refers to the correction value table 41, and extracts −0.00000001 as the correction value that corresponds to the phase of 12° that is expressed by the address signal. Then, by the addition circuit 42, the correcting section 40 adds the calculated value 0.20791170 of the calculation circuit 30 and the correction value −0.00000001 that was extracted from the correction value table 41, and outputs 0.20791169 as the value corresponding to the sine) sin(12°) that corresponds to the phase of 12°.

As described above, the trigonometric function calculating device 10 outputs the sine that corresponds to the phase expressed by the address signal. Further, in a case in which the address generator 11 successively outputs address signals such that the phases increase or decrease consecutively, a sine wave is outputted from the trigonometric function calculating device 10. Namely, the trigonometric function calculating device 10 can also be made to function as a sine wave generator.

Comparative Example

Figure 6:
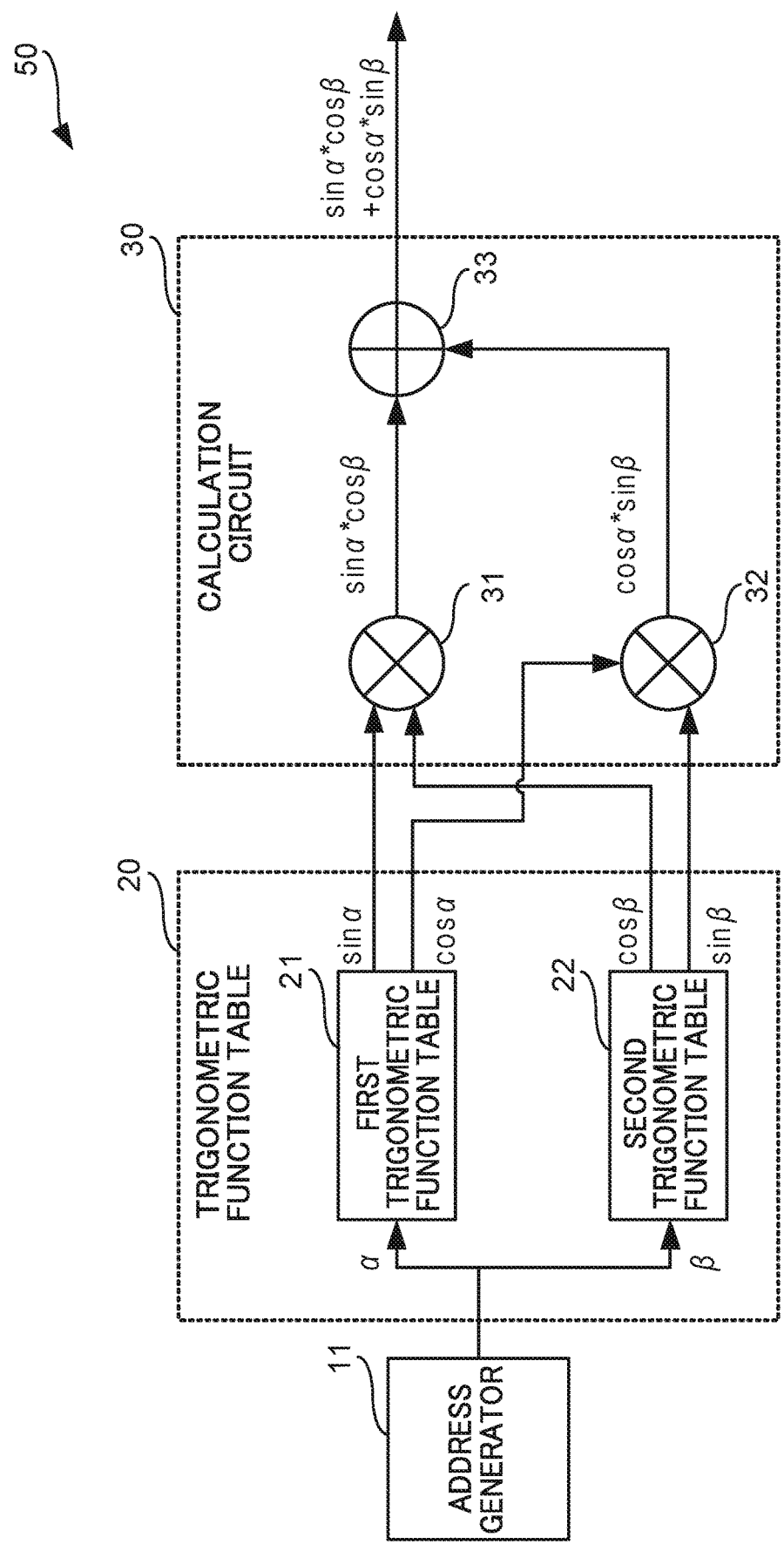
FIG. 6 is a block drawing showing an example of functional structures of a trigonometric function calculating device relating to a comparative example.

Hereinafter, a trigonometric function calculating device 50 relating to a comparative example is described, and is compared with the trigonometric function calculating device 10 relating to the present embodiment, with reference to the drawings and tables. FIG. 6 shows the trigonometric function calculating device 50 relating to the comparative example. The trigonometric function calculating device 50 relating to the comparative example differs in that it does not have the correcting section 40 of the trigonometric function calculating device 10 relating to the present embodiment, and uses the calculated value of the calculation circuit 30 as the value corresponding to sine $\sin(\alpha+\beta)$ that corresponds to the address signal. Note that the address generator 11, the trigonometric function table 20 and the calculation circuit 30 of the trigonometric function calculating device 50 relating to the comparative example function similarly to those of the trigonometric function calculating device 10 relating to the present embodiment. Therefore, description thereof is omitted, and the same structural elements are denoted by the same reference numerals.

First, the value, which is outputted by the trigonometric function calculating device 50 in a case in which the address generator 11 generates an address signal corresponding to the phase of 33°, is described as an example. Table 1 shows the errors between the actual values and the calculated values in a case of determining sine sin(33°) that is 8 digits to the right of the decimal point, while changing the numbers of digits to the right of the decimal point of the first sine, the first cosine, the second sine and the second cosine.

As shown in Table 1, the number of digits to the right of the decimal point of the first sine, the first cosine, the second sine and the second cosine, which is needed in order to determine sine sin(33°) to an accuracy of 8 decimal places, is 10 digits. An error arises between the calculated value and the actual value in a case in which there are 9 or fewer digits to the right of the decimal point of the first sine, the first cosine, the second sine and the second cosine.

TABLE 1

| number of digits to right of decimal point | first sine sin(30°) | first cosine cos(30°) | second sine sin(3°) | second cosine cos(3°) | calculated value sin(30°)*cos(3°) + *cos(30°)* sin(3°) | sin actual value sin(33°) | error |
|---|---|---|---|---|---|---|---|
| 9 | 0.500000000 | 0.865025404 | 0.052335956 | 0.998529535 | 0.54463903 | 0.54463904 | −0.00000001 |
| 10 | 0.5000000000 | 0.8660254038 | 0.0523359562 | 0.9986295348 | 0.54463904 |  | 0.00000000 |

The accuracy of the calculated value corresponding to sine $\sin(\alpha+\beta)$ that the trigonometric function calculating device 50 outputs in a case in which the address signal generated by the address generator 11 changes in incremental widths corresponding to a phase of 1° in the range corresponding to phases of 0° to 90°, is described with reference to Table 2 and Table 3. Table 2 and Table 3 show the errors between the actual values and the calculated values in a case of determining sine $\sin(\alpha+\beta)$ that is accurate to 8 decimal places, while changing the numbers of digits to the right of the decimal point of the first sine sin α, the first cosine cos α, the second sine sin β and the second cosine cos β. There are 10 digits to the right of the decimal point in Table 2, and 8 digits to the right of the decimal point in Table 3, of the first sine sin α, the first cosine cos α, the second sine sin β and the second cosine cos β.

As shown in Table 2 and Table 3, in order to determine, without error, the calculated value corresponding to sine $\sin(\alpha+\beta)$ to an accuracy of 8 decimal places, the number of digits to the right of the decimal point of first sine sin α, first cosine cos α, second sine sin β and second cosine cos β must respectively be 10 digits.

TABLE 2

| | | | number of digits to right of decimal point | | | | | | | |
|---|---|---|---|---|---|---|---|---|---|---|
| | | | ∞ | 10 | 10 | 10 | 10 | 8 | 8 | 8 |
| | | | | | | phase | | | | |
| α + β(°) | upper bits α (°) | lower bits β (°) | sin actual value sin(α + β) | first sine sinα | first cosine cosα | second sine sinβ | second cosine cosβ | calculated value sinα* cosβ + cosα* sinβ | sin actual value sin(α + β) | error ε |
|---|---|---|---|---|---|---|---|---|---|---|
| 0 | 0 | 0 | 0.0000000000 | 0.0000000000 | 1.0000000000 | 0.0000000000 | 1.0000000000 | 0.00000000 | 0.00000000 | 0.00000000 |
| 1 | 0 | 1 | 0.0174524064 | 0.0000000000 | 1.0000000000 | 0.0174524064 | 0.9998476952 | 0.01745241 | 0.01745241 | 0.00000000 |
| 2 | 0 | 2 | 0.0348994967 | 0.0000000000 | 1.0000000000 | 0.0348994967 | 0.9993908270 | 0.03489950 | 0.03489950 | 0.00000000 |
| 3 | 0 | 3 | 0.0523859562 | 0.0000000000 | 1.0000000000 | 0.0523859562 | 0.9986295348 | 0.05233596 | 0.05233596 | 0.00000000 |
| . | . | . | . | . | . | . | . | . | . | . |
| 9 | 0 | 9 | 0.1564344650 | 0.0000000000 | 1.0000000000 | 0.1564344850 | 0.9876883405 | 0.15643447 | 0.15643447 | 0.00000000 |
| 10 | 10 | 0 | 0.1736481777 | 0.1736481777 | 0.9648077530 | 0.0000000000 | 1.0000000000 | 0.17364818 | 0.17364818 | 0.00000000 |
| 11 | 10 | 1 | 0.1908089954 | 0.1736481777 | 0.9648077530 | 0.0174524064 | 0.9998476952 | 0.19080900 | 0.19080900 | 0.00000000 |
| 12 | 10 | 2 | 0.2079115905 | 0.1736481777 | 0.9648077530 | 0.0348994967 | 0.9993958270 | 0.20791169 | 0.20791169 | 0.00000000 |
| 13 | 10 | 3 | 0.2249510543 | 0.1736481777 | 0.9648077530 | 0.0523359562 | 0.9986295345 | 0.22495105 | 0.22495105 | 0.00000000 |
| 14 | 10 | 4 | 0.2419218956 | 0.1736481777 | 0.9648077530 | 0.0697564737 | 0.9975640503 | 0.24192190 | 0.24192190 | 0.00000000 |
| 15 | 10 | 5 | 0.2585190451 | 0.1736481777 | 0.9648077530 | 0.0871557427 | 0.9961946961 | 0.25881905 | 0.25881905 | 0.00000000 |
| . | . | . | . | . | . | . | . | . | . | . |
| 89 | 80 | 9 | 0.9995475952 | 0.9648077530 | 0.1736481777 | 0.1564344850 | 0.9676853406 | 0.99984770 | 0.99984770 | 0.00000000 |
| 90 | 90 | 0 | 1.0000000000 | 1.0000000000 | 0.0000000000 | 0.0000000000 | 1.0000000000 | 1.00000000 | 1.00000000 | 0.00000000 |

TABLE 3

| | | | number of digits to right of decimal point | | | | | | | |
|---|---|---|---|---|---|---|---|---|---|---|
| | | | ∞ | 8 | 8 | 8 | 8 | 8 | 8 | 8 |
| | | | | | | phase | | | | |
| α + β(°) | upper bits α (°) | lower bits β (°) | sin actual value sin(α + β) | first sine sinα | first cosine cosα | second sine sinβ | second cosine cosβ | calculated value sinα* cosβ + cosα* sinβ | sin actual value sin(α + β) | error ε |
|---|---|---|---|---|---|---|---|---|---|---|
| 0 | 0 | 0 | 0.0000000000 | 0.00000000 | 1.00000000 | 0.00000000 | 1.00000000 | 0.00000000 | 0.00000000 | 0.00000000 |
| 1 | 0 | 1 | 0.0174524064 | 0.00000000 | 1.00000000 | 0.01745241 | 0.99984770 | 0.01745241 | 0.01745241 | 0.00000000 |
| 2 | 0 | 2 | 0.0348994967 | 0.00000000 | 1.00000000 | 0.03489950 | 0.99939053 | 0.03489950 | 0.03489950 | 0.00000000 |
| 3 | 0 | 3 | 0.0523359562 | 0.00000000 | 1.00000000 | 0.05233596 | 0.95662963 | 0.05233596 | 0.05233596 | 0.00000000 |
| . | . | . | . | . | . | . | . | . | . | . |
| 9 | 0 | 9 | 0.1684344650 | 0.00000000 | 1.00000000 | 0.15643447 | 0.98768834 | 0.15643447 | 0.15643447 | 0.00000000 |
| 10 | 10 | 0 | 0.1736451777 | 0.17364818 | 0.98480775 | 0.00000000 | 1.00000000 | 0.17364815 | 0.17364818 | 0.00000000 |
| 11 | 10 | 1 | 0.1908089954 | 0.17364818 | 0.98480775 | 0.01746241 | 0.99954770 | 0.19080900 | 0.19080900 | 0.00000000 |
| 12 | 10 | 2 | 0.2079116908 | 0.17364818 | 0.98480775 | 0.03459950 | 0.99939083 | 0.20791170 | 0.20791169 | −0.00000001 |
| 13 | 10 | 3 | 0.2249510543 | 0.17364818 | 0.98480775 | 0.05233596 | 0.99862963 | 0.22495106 | 0.22495105 | −0.00000001 |
| 14 | 10 | 4 | 0.2419218956 | 0.17364818 | 0.98480775 | 0.06975647 | 0.99756405 | 0.24182189 | 0.24192190 | 0.00000001 |
| 15 | 10 | 5 | 0.2588190451 | 0.17364818 | 0.98480775 | 0.08715574 | 0.99619470 | 0.25881904 | 0.25881905 | 0.00000001 |
| . | . | . | . | . | . | . | . | . | . | . |
| 89 | 80 | 9 | 0.9996476952 | 0.98480775 | 0.17364818 | 0.15643447 | 0.98758834 | 0.99984769 | 0.99984770 | 0.00000001 |
| 90 | 90 | 0 | 1.0000000000 | 1.00000000 | 0.00000000 | 0.00000000 | 1.00000000 | 1.00000000 | 1.00000000 | 0.00000000 |

In this way, in accordance with the trigonometric function calculating device 50 relating to the comparative example, in order to determine the calculated value of sine $\sin(\alpha+\beta)$ of a predetermined accuracy, in consideration of errors in calculation that are due to the addition theorem of trigonometric functions, the data lengths of the first sine $\sin \alpha$, first cosine $\cos \alpha$, second sine $\sin \beta$ and second cosine $\cos \beta$ that are stored in the trigonometric function table 20 must be made to be long. If the data lengths of the first sine $\sin \alpha$, first cosine $\cos \alpha$, second sine $\sin \beta$ and second cosine $\cos \beta$ are long, the circuit sizes of the calculation circuits, such as the first multiplication circuit 31, the second multiplication circuit 32, the addition circuit 33 and the like that carry out calculation processings by using these data, become large.

Concretely, in accordance with the trigonometric function calculating device 50 relating to the comparative example, for example, in order to determine, without error, sine $\sin(\alpha+\beta)$ of an accuracy of 8 decimal places, data of an accuracy of 10 decimal places must be stored in the first trigonometric function table 21 and the second trigonometric function table 22, respectively. Namely, 34 bits are needed to express each data.

On the other hand, as described above, in accordance with the trigonometric function calculating device 10 relating to the present embodiment, for example, in order to determine, without error, sine $\sin(\alpha+\beta)$ of an accuracy of 8 decimal places, it suffices for the data that are stored in the first trigonometric function table 21 and the second trigonometric function table 22 respectively to be accurate to 8 decimal places. Namely, each data can be expressed by 27 bits. Accordingly, in accordance with the trigonometric function calculating device 10 relating to the present embodiment, the number of bits of the data that are stored in the first trigonometric function table 21 and the second trigonometric function table 22 can be reduced as compared with the trigonometric function calculating device 50 relating to the comparative example. Therefore, the accuracy of the trigonometric function calculation can be ensured without being accompanied by an increase in the circuit sizes of the calculation circuits.

As described above, in accordance with the trigonometric function calculating device 10 relating to the present embodiment, even if the data lengths of the first sine, the first cosine, the second sine and the second cosine that are stored in the first trigonometric function table 21 and the second trigonometric function table 22 respectively are values having 8 digits to the right of the decimal point, the derived sine values can be accurate to 8 decimal places due to the calculated value of the calculation circuit 30 being corrected by the correcting section 40. Namely, the accuracy of the trigonometric function calculation can be ensured without being accompanied by an increase in the circuit sizes of the calculation circuits.

Further, in accordance with the trigonometric function calculating device 10 relating to the present embodiment, because the data lengths of the data that are stored in the first trigonometric function table 21 and the second trigonometric function table 22 can be made to be short, the processing speeds of the calculation circuits can be improved.

In accordance with the trigonometric function calculating device 10 relating to the present embodiment, because the data lengths of the data that are stored in the first trigonometric function table 21 and the second trigonometric function table 22 can be made to be short, the capacity of the storage section 12 that stores the respective tables can be reduced.

Note that the above-described embodiment is an aspect in which the first sines, the first cosines, the second sines and the second cosines that are used in deriving calculated values are stored so as to be divided between the first trigonometric function table 21 and the second trigonometric function table 22. However, the present disclosure is not limited to this. There may be an aspect in which the first sines, the first cosines, the second sines and the second cosines are collectively stored in a single table.

Note that the above-described embodiment is an aspect in which the sine that corresponds to the address signal is outputted as the calculated value by using formula (1) as the addition theorem of trigonometric functions. However, the present disclosure is not limited to this aspect. There may be an aspect in which the cosine that corresponds to the address signal is outputted as the calculated value by using formula (2) as the addition theorem of trigonometric functions. In this case, the first multiplication circuit 31 outputs product $\cos \alpha * \cos \beta$ of the first cosine $\cos \alpha$ and the second cosine $\cos \beta$ that were extracted from the trigonometric function table 20. The second multiplication circuit 32 outputs product $\sin \alpha * \sin \beta$ of the first sine $\sin \alpha$ and the second sine $\sin \beta$ that were extracted from the trigonometric function table 20. A subtraction circuit (not illustrated), which is provided instead of the addition circuit 33, subtracts outputted value $\sin \alpha * \sin \beta$ of the second multiplication circuit 32 from outputted value $\cos \alpha * \cos \beta$ of the first multiplication circuit 31, and outputs calculated result $\cos \alpha * \cos \beta - \sin \alpha * \sin \beta$ as the calculated value of the calculation circuit 30.

[Formula 2]

$$\cos(\alpha+\beta) = \cos \alpha \cos \beta - \sin \alpha \sin \beta \qquad \text{Formula (2)}$$

Further, in the above-described aspect, various types of processors that are mentioned next can be used as the hardware structures of the processing units that execute the various processings and that are, for example, the address generator 11, the trigonometric function table 20, the calculation circuit 30 and the correcting section 40. These various types of processors encompass, in addition to CPUs that are generally-used processors that execute software (programs) and function as various types of processing sections, PLDs (Programmable Logic Devices) whose circuit structure can be changed after production such as FPGAs and the like, or dedicated electrical circuits that are processors having circuit structures that are designed for the sole purpose of executing specific processings such as ASICs (Application Specific Integrated Circuits) and the like, or the like.

One processing section may be structured by one of these various types of processors, or may be structured by a combination of two or more of the same type or different types of processors (e.g., a combination of plural FPGAs, or a combination of a CPU and an FPGA). Further, plural processing sections may be structured by a single processor. As an example of a structure in which plural processing sections are structured by a single processor, first, there is a form in which one processor is structured by a combination of one or more CPUs and software, as exemplified by clients and a computer such as a server or the like, and this processor functions as the plural processing sections. Second, there is a form that uses a processor, which realizes the functions of the entire system including the plural processing sections by a single IC (Integrated Circuit) chip, as exemplified by a System On Chip (SoC) or the like. In this way, the various processing sections are structured by using one or more of the above-described types of processors as the hardware structures.

Moreover, circuitry that combines circuit elements, and more concretely, semiconductor elements and the like, can be used as the hardware structures of these various types of processors.

What is claimed is:

1. A trigonometric function calculating device comprising at least one processor and at least one memory, wherein:
   the at least one processor is configured to generate an address signal that is formed from a plurality of bit strings and that corresponds to a phase;
   the at least one memory stores a trigonometric function table that includes first sines and first cosines that respectively correspond to phases expressed by upper bits of the address signals, and second sines and second cosines that respectively correspond to phases expressed by lower bits of the address signals;
   the at least one processor is configured to output, as a calculated value, a sine that corresponds to the address signal by calculating processing using the first sine, the first cosine, the second sine and the second cosine that correspond to the address signal and have been extracted by referring to the trigonometric function table; and
   the at least one processor is configured to correct the calculated value on the basis of a correction value that corresponds to the address signal.

2. The trigonometric function calculating device of claim 1, wherein the at least one memory includes a correction value table that includes correction values that respectively correspond to phases expressed by the address signals, and the at least one processor is configured to correct the calculated value on the basis of the correction value that corresponds to the address signal and that has been extracted by referring to the correction value table.

3. The trigonometric function calculating device of claim 2, wherein the trigonometric function table includes:
   a first trigonometric function table that stores the first sines and the first cosines that respectively correspond to the phases expressed by the upper bits of the address signals; and
   a second trigonometric function table that stores the second sines and the second cosines that respectively correspond to the phases expressed by the lower bits of the address signals.

4. The trigonometric function calculating device of claim 3, wherein
   the at least one processor is configured to perform a first multiplication that outputs a product of the first sine and the second cosine;
   the at least one processor is configured to perform a second multiplication that outputs a product of the second sine and the first cosine; and
   the at least one processor is configured to add an outputted value of the first multiplication and an outputted value of the second multiplication.

5. The trigonometric function calculating device of claim 2, wherein
   the at least one processor is configured to perform a first multiplication that outputs a product of the first sine and the second cosine;
   the at least one processor is configured to perform a second multiplication that outputs a product of the second sine and the first cosine; and
   the at least one processor is configured to add an outputted value of the first multiplication and an outputted value of the second multiplication.

6. The trigonometric function calculating device of claim 1, wherein the trigonometric function table includes:
   a first trigonometric function table that stores the first sines and the first cosines that respectively correspond to the phases expressed by the upper bits of the address signals; and a second trigonometric function table that stores the second sines and the second cosines that respective correspond to the phases expressed by the lower bits of the address signals.

7. The trigonometric function calculating device of claim 6, wherein
   the at least one processor is configured to perform a first multiplication that outputs a product of the first sine and the second cosine;
   the at least one processor is configured to perform a second multiplication that outputs a product of the second sine and the first cosine; and
   the at least one processor is configured to add an outputted value of the first multiplication and an outputted value of the second multiplication.

8. The trigonometric function calculating device of claim 1, wherein
   the at least one processor is configured to perform a first multiplication that outputs a product of the first sine and the second cosine;
   the at least one processor is configured to perform a second multiplication that outputs a product of the second sine and the first cosine; and
   the at least one processor is configured to add an outputted value of the first multiplication and an outputted value of the second multiplication.

9. A trigonometric function calculating device comprising at least one processor and at least one memory, wherein:
   the at least one processor is configured to generate an address signal that is formed from a plurality of bit strings and that corresponds to a phase;
   the at least one memory stores a trigonometric function table that includes first sines and first cosines that respectively correspond to phases expressed by upper bits of the address signals, and second sines and second cosines that respectively correspond to phases expressed by lower bits of the address signals;
   the at least one processor is configured to output, as a calculated value, a cosine that corresponds to the address signal by calculating processing using the first sine, the first cosine, the second sine and the second cosine that correspond to the address signal and have been extracted by referring to the trigonometric function table; and
   the at least one processor is configured to correct the calculated value on the basis of a correction value that corresponds to the address signal.

* * * * *